United States Patent [19]

Sawada et al.

[11] Patent Number: 4,718,964

[45] Date of Patent: Jan. 12, 1988

[54] METHOD FOR PRODUCING SOUND BAR FOR PERCUSSIVE MUSICAL INSTRUMENTS

[75] Inventors: Shuichi Sawada; Yoshihiko Murase, both of Hamamatsu, Japan

[73] Assignee: Nippon Gakki Seizo Kabushiki Kaisha, Japan

[21] Appl. No.: 936,906

[22] Filed: Dec. 2, 1986

Related U.S. Application Data

[62] Division of Ser. No. 736,569, May 21, 1985, Pat. No. 4,649,791.

[30] Foreign Application Priority Data

May 30, 1984 [JP] Japan ................................ 59-110124

[51] Int. Cl.$^{4}$ ....................... B32B 31/18; G10D 13/08

[52] U.S. Cl. .................................... 156/252; 156/257; 156/264; 84/402

[58] Field of Search ............... 156/257, 264, 268, 252, 156/253; 84/402, 403, 404

[56] References Cited

U.S. PATENT DOCUMENTS 4,086,382 4/1978 Hites .................................. 156/257
4,411,187 10/1983 Roper et al. ........................ 84/402 R
4,485,860 12/1984 Avilla .................................. 156/257

FOREIGN PATENT DOCUMENTS 2431151 1/1976 Fed. Rep. of Germany .... 84/402 R

*Primary Examiner*—Caleb Weston
*Attorney, Agent, or Firm*—Lerner, David, Littenberg, Krumholz & Mentlik

[57] ABSTRACT

In construction of a FRP sound bar preferably by lamination for percussive musical instruments, 30 to 80% by volume of reinforcing fibers are oriented in a resin matrix at least in the longitudinal direction of the sound bar and a plurality of longitudinal pores are almost uniformly distributed over the entire cross section of the sound bar, for easy and low cost production with ideal sound extension.

7 Claims, 8 Drawing Figures

METHOD FOR PRODUCING SOUND BAR FOR PERCUSSIVE MUSICAL INSTRUMENTS

This is a division, of application Ser. No. 736,569, filed 5/21/85, now U.S. Pat. No. 4,649,791.

BACKGROUND OF THE INVENTION

The present invention relates to a sound bar for percussive musical instruments and a method of producing same, and more particularly relates to improvement in production of FRP sound bar used for percussive musical instrument such as xylophones, marimbas and vibraphones.

Conventional use of wood for production of sound bars is inevitably accompanied with poor uniformity in material quality and seasonal variation in tone quality such as tone colour and tonal pitch.

As a substitute for wood, use of FRP (fiber reinforced plastics) has already been proposed. The invention of Japanese Patent Opening Sho. 59-19997 is one of such proposals. According to this earlier proposal, a FRP sound bar includes a number of voids elongated in the direction of the fiber orientation, and assures characteristic extension of sounds with mind and warm tone colours. In production of the sound bar of this earlier proposal, fibers or thin rods made of low melting point alloys, thermoplastic resins or thermo-meltable materials are dispersed in a resin matrix in the direction of the fiber orientation for formulation of the above-described voids, and the resin matrix are heated in order to remove these fibers or rods through melting. This process necessitates multi-staged operational steps which naturally result in high production cost.

SUMMARY OF THE INVENTION

It is the object of the present invention to enable easy production of a FRP sound bar of high tonal quality at low production cost.

In accordance with the first aspect of the present invention, a number of reinforcing fibers are dispersed in a resin matrix and elongated at least in the longitudinal direction of a sound bar, volume content ratio of the reinforcing fibers with respect to the resin matrix is in a range from 30 to 80%, and a plurality of longitudinal pores are formed in the sound bar whilst being almost uniformly distributed over the entire cross section.

In accordance with the second aspect of the present invention, a plate like FRP component is formed by orienting in a resin matrix a number of reinforcing fibers at least in the longitudinal direction of the FRP component, at least an array of longitudinal pores or grooves are formed in the FRP component, a plurality of FRP components are laminated and bonded together into a face to face combination, a bottom cutout for tonal pitch adjustment is formed in one face of the combination.

DESCRIPTION OF THE PREFERRED EMBODIMENTS

Production of the sound bar in accordance with the present invention is based on the art of lamination in which a plurality of FRP components each given in the form of a thin plate are laminated together.

Figure 1A:
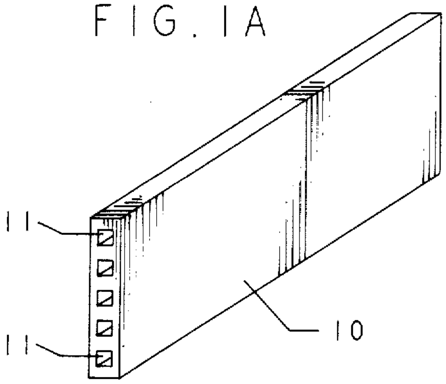
FIGS. 1A and 1B are perspective views of the first two examples of the FRP component used for production of the sound bar in accordance with the present invention.

One example of such a FRP component is shown in FIG. 1A, in which the FRP component 10 includes an array of longitudinal pores 11 each of which has a square cross section. Depending on the thickness of the FRP component 10 and/or the size of the longitudinal pores 11, two or more arrays of longitudinal pores 11 may be included as long as they are almost uniformly distributed over the entire cross section of the FRP component 10. In the construction of the FRP component 10, a number of reinforcing fibers are dispersed in a resin matrix and elongated at least in the longitudinal direction of the FRP component. In terms of the mechanical strength of the sound bar, however, they may be partly oriented in different directions.

Figure 1B:
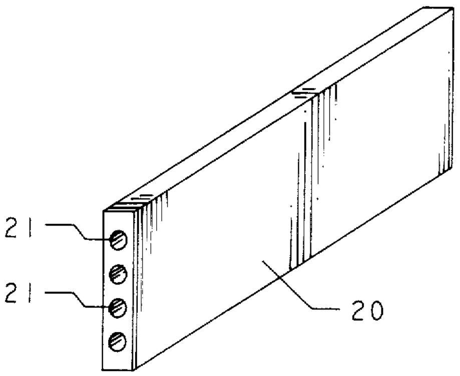

Another example of the FRP component is shown in FIG. 1B, in which the FRP component 20 includes an array of longitudinal pores 21 each of which has a round cross section.

Figure 2:
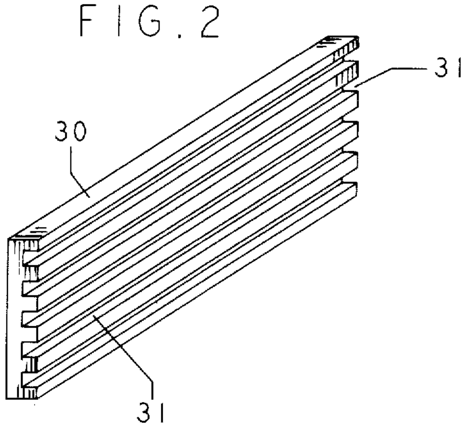
FIG. 2 is a perspective view of the second example of the FRP component used for production of the sound bar in accordance with the present invention.

The other example of the FRP component is shown in FIG. 2, in which the FRP component 30 includes an array of longitudinal grooves 31 each of which has a square cross section. Alternatively, the longitudinal groove 31 may have a crescent cross section.

For reinforcement, boron fibers, glass fibers, aramid fibers, carbon filters, and whiskers such as those of silicon carbide and boron nitride are used either individually or in combination. In particular, high elastic carbon fibers are preferably used.

For the matrix, thermosetting resins such as epoxy resin, unsaturated polyester resin and phenol resin are used. In particular, epoxy resins show good adherence to carbon fibers. Oriented reinforcing fibers are immersed in a resin bath before setting.

Volume content ratio of the reinforcing fibers with respect to the resin matrix should be in a range from 30 to 80%, and more preferably from 50 to 65%. No sufficient reinforcement is expected when the content ratio falls short of 30% and no uniform dispersion of the reinforcing fibers is resulted at any content ratio above 80%. In either case, no ideal extension of sound is obtained. The kind and the content ratio of the fibers to be added is fixed so that the Young's modulus of the product should be 2000 $kg/mm^2$ or larger. A part of the reinforcing fibers may take the form of a cloth or cloths.

As remarked above, the FRP component includes a plurality of longitudinal pores or grooves. The total size of the longitudinal pores or grooves in the thickness direction of the FRP component should be 90% or less of the thickness of the FRP component. When the total size exceeds this upper limit, the bending strength of the FRP component is unacceptably lowered.

The longitudinal pores or grooves should be almost uniformly distributed over the entire cross section of the sound bar. Further, the total cross sectional surface area of the longitudinal pores or grooves should preferably be in a range from 5 to 70% of that of the sound bar, and the cross sectional surface area of each longitudinal pore or groove should be 300 mm$^2$ or less. When the longitudinal pore or groove exceeds in size this upper limit, void resonance of the longitudinal pore or groove poses maleign influence on the tone quality. When the distribution of the longitudinal pores or grooves is biased in the thickness direction of the sound bar, change in size of a bottom cutout for tonal pitch adjustment results in change in tone quality. Further, when the distribution of the longitudinal pores or grooves is biased in the width direction of the sound bar, such biased pore (or groove) distribution produces deformation component which increases outer shearing strain in addition to normal flex vibration, thereby reducing extension of tones.

Figure 3:
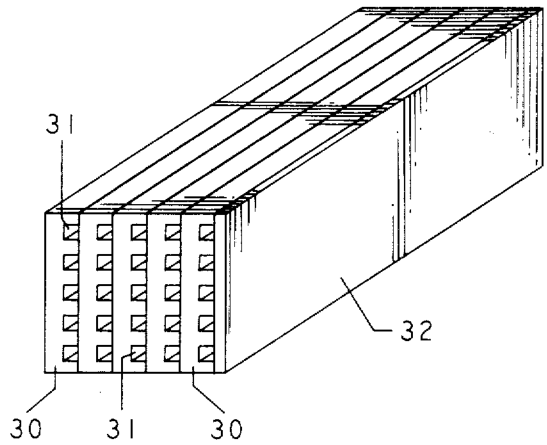
FIGS. 3 and 4 are perspective views of one example of the operational steps in production of the sound bar in accordance with the present invention.
Figure 4:
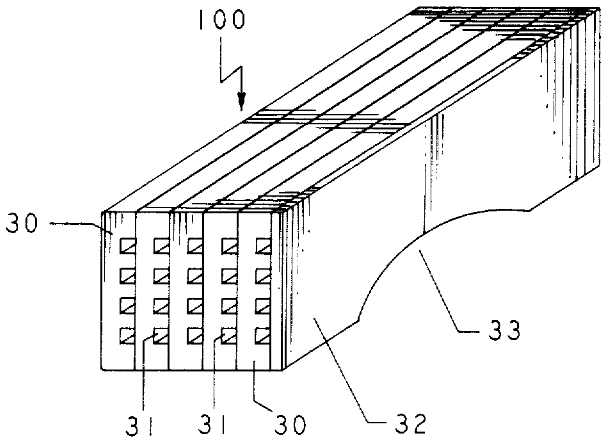

In one typical production method in accordance with the present invention, a plurality of FRP components are laminated together. On example is shown in FIGS. 3 and 4, in which the FRP components 30 shown in FIG. 2 are used. As seen in FIG. 3, they are laminated together so that the grooved face on a FRP component 30 should mate with the flat face of an adjacent FRP component 30. The last grooved face of a laminated combination is covered with a FRP flat plate. When FRP components such as shown in FIGS. 1A and 1B are used, they are just put together in face to face combination without use of any flat plate. At lamination, glass fibers matts and/or carbon fiber matts must be interposed between adjacent FRP components for high rigidity bonding. Epoxy resin or resorcinol type bonds are preferably used for lamination. A sound bar 100 such as shown in FIG. 4 is obtained, which has a bottom cutout 33 for tonal pitch adjustment.

The position of the bottom cutout should be chosen so that the striking face of the sound bar opposite to the bottom cutout should extend in a plane normal to the bond layers between the FRP components. With this arrangement, no stress concentration such as shearing deformation occurs on the bond layers at flex deformation, thereby well mitigating rise in tan $\delta$ and, as a consequence, assuring good extension of tones. Otherwise, high rise in tan $\delta$ would be caused by presence of the bond layers. Should the striking face of the sound bar extend in parallel to the bond layers between the FRP component, concentration of shearing deformation occures on the low elastic bond layers at flex deformation of the high elastic FRP components and raises tan $\delta$ of the entire sound bar, thereby reducing extension of sounds. Since this stress concentration is significant for high harmonics, tactful choice of bonds of low tan $\delta$ generates wood like sounds. Thus, combination of sound bars of different striking face arrangements enables free tone colour design.

In one actual example of the construction shown in FIG. 3, five FRP components 30 each having 4 to 5 longitudinal grooves 31 are laminated together, and the cross sectional surface area of each groove amounts to 3 mm$\times$2.5 mm$=$7.5 mm$^2$.

Figure 5:
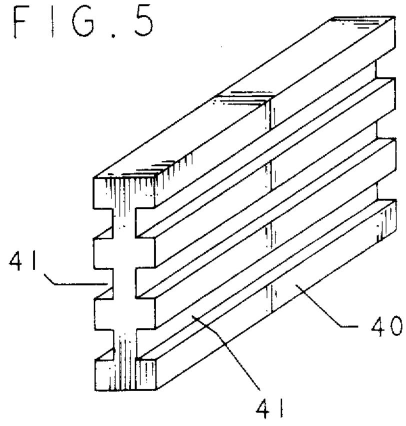
FIG. 5 is a perspective view of the third example of the FRP component used for production of the sound bar in accordance with the present inventions.
Figure 6A:
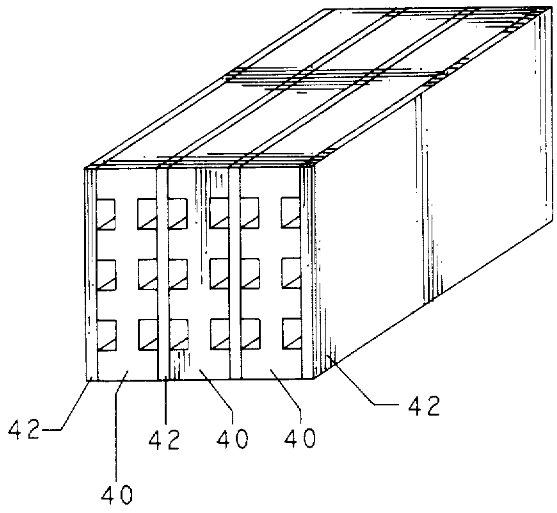
FIGS. 6A and 6B are perspective view of two examples of the laminated combinations made of the FRP component shown in FIG. 5.
Figure 6B:
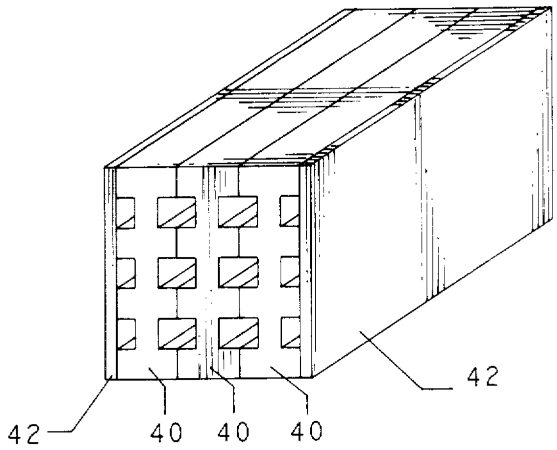

The still other example of the FRP component is shown in FIG. 5, in which the FRP component 40 includes two arrays of longitudinal grooves 41 which are arranged in opposite faces. Although longitudinal grooves of square cross section are shown, they may have crescent cross sections. Such FRP components 40 may be assembled together into different laminated combinations. One example is shown in FIG. 6A, in which a plurality of FRP components 40 and a plurality of FRP flat plates 45 are alternately laminated together so that the last grooved faces are covered with the FRP flat plates 42. Another example is shown in FIG. 6B, in which a plurality of FRP components 40 are laminated together and only the last grooved faces are covered with FRP flat plates 42.

We claim:

1. A method for producing a sound bar for percussive musical instruments comprising the steps of forming a plate like FRP component by orienting in a resin matrix a number of reinforcing fibers at least in the longitudinal direction of said FRP component, forming at least an array of longitudinal pores in said FRP component, laminating and bonding together a plurality of said FRP component into a face to face combination, and forming a bottom cutout for tonal pitch adjustment in one face of said combination.

2. A method for producing a sound bar for percussive musical instruments comprising the steps of forming a plate like FRP component by orienting in a resin matrix a number of reinforcing fibers at least in the longitudinal direction of said FRP component, forming at least one array of longitudinal grooves in at least one face of said FRP component, laminating and bonding together a plurality of said FRP components in a face to face arrangement, covering at least one last grooved face of said arrangement with at least one flat FRP plate to form a face to face combination and forming a bottom cutout for tonal pitch adjustment in one face of said combination.

3. A method as claimed in claim 1 or 2 in which said bottom cutout is formed in a face normal to bond layers between said FRP component.

4. A method as claimed in claim 1 or 2 in which said bottom cutout is formed in a face parallel to bond layers between said FRP components.

5. Method as claimed in claim 2 in which one array of longitudinal grooves are formed in one face of said FRP component, and the grooved face of a FRP component in said arrangement mates with the flat face of an adjacent FRP component.

6. Method as claimed in claim 2 in which two arrays of longitudinal grooves are formed in opposite faces of said FRP component.

7. Method as claimed in claim 6 in which said FRP plates are interposed between adjacent FRP components also.

* * * * *

UNITED STATES PATENT AND TRADEMARK OFFICE
CERTIFICATE OF CORRECTION

PATENT NO. : 4,718,964

DATED : January 12,1988

INVENTOR(S) : Sawada et al.

It is certified that error appears in the above-identified patent and that said Letters Patent is hereby corrected as shown below:

Column 1, line 26, "mind" should read --mild--.
Column 1, line 31, "formulation" should read --formation--.
Column 2, line 42, "filters" should read --fibers--.
Column 3, line 33, "must" should read --may--.

Signed and Sealed this

Twenty-first Day of June, 1988

*Attest:*

DONALD J. QUIGG

*Attesting Officer*

*Commissioner of Patents and Trademarks*